United States Patent
Khare et al.

(10) Patent No.: US 12,034,733 B2
(45) Date of Patent: Jul. 9, 2024

(54) AUTHORIZATION IN COMMUNICATION NETWORKS

(71) Applicant: Nokia Technologies Oy, Espoo (FI)

(72) Inventors: Saurabh Khare, Bangalore (IN); Colin Kahn, Morris Plains, NJ (US); Georgios Gkellas, Petroupoli (GR); Yannick Lair, Voisins le Bretonneux (FR); Anja Jerichow, Grafing bei München (DE); Chaitanya Aggarwal, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 263 days.

(21) Appl. No.: 17/494,930

(22) Filed: Oct. 6, 2021

(65) Prior Publication Data

US 2022/0116400 A1 Apr. 14, 2022

(30) Foreign Application Priority Data

Oct. 12, 2020 (IN) .............................. 202041044341

(51) Int. Cl.
*H04L 9/40* (2022.01)
*H04W 12/06* (2021.01)
*H04W 12/08* (2021.01)

(52) U.S. Cl.
CPC .......... *H04L 63/102* (2013.01); *H04L 63/083* (2013.01); *H04W 12/06* (2013.01); *H04W 12/08* (2013.01)

(58) Field of Classification Search
CPC ..... H04L 63/102; H04L 63/083; H04L 67/51; H04L 67/55; H04L 67/02; H04L 63/0884;
(Continued)

(56) References Cited

U.S. PATENT DOCUMENTS 10,671,749 B2 * 6/2020 Felice-Steele .......... G06F 16/13
10,936,191 B1 * 3/2021 Lakshminarayanan .....................
G06F 3/067
(Continued)

FOREIGN PATENT DOCUMENTS

| CN | 109587187 A | 4/2019 |
|---|---|---|
| CN | 111107047 A | 5/2020 |
| WO | 2020/002764 A1 | 1/2020 |

OTHER PUBLICATIONS

Extended European Search Report received for corresponding European Patent Application No. 21199707.7, dated Feb. 15, 2022, 8 pages.
(Continued)

*Primary Examiner* — Matthew Smithers
(74) *Attorney, Agent, or Firm* — Robert P. Michal, Esq.; Carter, DeLuca & Farrell LLP (57) ABSTRACT

According to an example aspect of the present invention, there is provided a method comprising, receiving, by an intermediary network function, a subscription request from a network function consumer requesting data of a network function producer, wherein the subscription request comprises a client credential assertion of the network function consumer and an access token, authorizing and authenticating, by the intermediary network function, the network function consumer upon successful validation of the access token and the client credential assertion validation and transmitting, by the intermediary network function, an access token request to an authorization server to get another access token, wherein said another access token is to be used to validate the network function consumer to access services of the network function producer, and the access token
(Continued)

Receiving, by an intermediary NF, a subscription request from an NFc requesting data of an NFp, wherein the subscription request comprises a CCA of the NFc and an access token — 510

Authorizing and authenticating, by the intermediary NF, the NFc upon successful validation of the access token and the CCA — 520

Transmitting, by the intermediary NF, an access token request to an authorization server to get another access token, wherein said another access token is to be used to validate the NFc to access services of the NFp, and the access token request comprises the CCA of the NFc requesting data of the NFp — 530 request comprises the client credential assertion of the network function consumer requesting data of the network function producer.

13 Claims, 6 Drawing Sheets

(58) Field of Classification Search
CPC .... H04L 67/56; H04L 63/0807; H04W 12/06; H04W 12/08; H04W 12/084
See application file for complete search history.

(56) References Cited

U.S. PATENT DOCUMENTS

| | | | | |
|---|---|---|---|---|
| 11,622,276 | B1* | 4/2023 | Wan | H04W 88/182 455/411 |
| 2010/0229232 | A1 | 9/2010 | Hellgren et al. | |
| 2012/0204221 | A1* | 8/2012 | Monjas Llorente | H04L 63/102 726/1 |
| 2013/0139241 | A1* | 5/2013 | Leeder | H04W 12/068 726/9 |
| 2014/0007198 | A1* | 1/2014 | Durbha | H04L 63/102 726/4 |
| 2014/0331297 | A1* | 11/2014 | Innes | H04L 63/0823 726/7 |
| 2015/0143471 | A1* | 5/2015 | Kim | H04W 48/02 726/4 |
| 2016/0142409 | A1* | 5/2016 | Frei | G06F 21/33 713/176 |
| 2017/0141926 | A1* | 5/2017 | Xu | H04L 63/0209 |
| 2018/0183802 | A1* | 6/2018 | Choyi | H04L 63/205 |
| 2019/0251241 | A1 | 8/2019 | Bykampadi et al. | |
| 2019/0281040 | A1* | 9/2019 | Dhamankar | G06Q 20/085 |
| 2020/0320516 | A1* | 10/2020 | Royyuru | G06Q 20/3674 |
| 2021/0165871 | A1* | 6/2021 | Jensen | G06F 21/6218 |
| 2021/0250172 | A1* | 8/2021 | Choyi | H04L 9/3239 |
| 2021/0250344 | A1* | 8/2021 | Qi | H04W 12/06 |
| 2021/0336966 | A1* | 10/2021 | Gujarathi | H04L 9/3247 |
| 2023/0148296 | A1* | 5/2023 | Puente Pestaña | H04W 60/06 455/435.1 |
| 2023/0283470 | A1* | 9/2023 | Rodrigo | H04L 9/32 713/172 |

OTHER PUBLICATIONS

"3rd Generation Partnership Project; Technical Specification Group Services and System Aspects; Security architecture and procedures for 5G system (Release 16)", 3GPP TS 33.501, V16.4.0, Sep. 2020, pp. 1-250.

"KI #1,#2 & #11 sol #9: Updates regarding authorization", 3GPP TSG-SA WG2 Meeting #140e, S2-2005116, Agenda Item: 8.1, Ericsson, Aug. 19-Sep. 2, 2020, 2 pages.

"Authorization of NF Service Consumers for data access via DCCF", 3GPP TSG-SA3 Meeting #103-e, S3-212161, Agenda Item: 5.16, Nokia, May 17-28, 2021, 5 pages.

"3rd Generation Partnership Project; Technical Specification Group Services and System Aspects; Security architecture and procedures for 5G system (Release 16)", 3GPP TS 33.501, V16.3.0, Jul. 2020, pp. 1-248.

"3rd Generation Partnership Project; Technical Specification Group Services and System Aspects; Architecture enhancements for 5G System (5GS) to support network data analytics services (Release 16)", 3GPP TS 23.288, V16.4.0, Jul. 2020, pp. 1-66.

"3rd Generation Partnership Project; Technical Specification Group Services and System Aspects; Study of Enablers for Network Automation for 5G (Release 16)", 3GPP TR 23.791, V16.2.0, Jun. 2019, pp. 1-124.

"3rd Generation Partnership Project; Technical Specification Group Services and System Aspects; Study on enablers for network automation for the 5G System (5GS); Phase 2 (Release 17)", 3GPP TR 23.700-91, V0.4.0, Jun. 2020, pp. 1-186.

India Application No. 202041014737, "Improved Authorization in Communication Networks", filed on Apr. 2, 2020, pp. 1-34.

"3rd Generation Partnership Project; Technical Specification Group Core Network and Terminals; 5G System; Network Function Repository Services; Stage 3 (Release 16)", 3GPP TS 29.510, V16.4.0, Jul. 2020, pp. 1-192.

Notice of Allowance received for corresponding European Patent Application No. 21199707.7, dated Feb. 21, 2024, 8 pages.

Office action received for corresponding Chinese Patent Application No. 202111187437.7, dated Feb. 23, 2024, 9 pages of office action and English translation, 10 pages, total 19 pages.

"Re-using access token in indirect communication with delegated discovery", 3GPP TSG-SA3 Meeting #100e, S3-201802, Nokia, Aug. 17-28, 2020, 3 pages.

"Authorization of NF service access", 3GPP TSG-SA3 Meeting #100e, S3-202189, Nokia, Aug. 17-28, 2020, 14 pages.

* cited by examiner

AUTHORIZATION IN COMMUNICATION NETWORKS

FIELD

Various example embodiments relate in general to communication networks, such as core networks of cellular communication systems, and more specifically, to authorization in such networks.

BACKGROUND

Authorization is needed in various communication networks to ensure that only users and network entities that have a right to access certain services can do that. Proper authorization needs to be ensured for example in core networks of cellular communication systems, such as in 5G core networks developed by the 3rd Generation Partnership Project, 3GPP. The 3GPP still develops 5G core networks and there is a need to provide improved methods, apparatuses and computer programs for improving authorization in 5G core networks. Such improvements may be useful in other communication networks as well.

SUMMARY

According to some aspects, there is provided the subject-matter of the independent claims. Some example embodiments are defined in the dependent claims.

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

According to a first aspect of the present invention, there is provided an apparatus comprising at least one processor, at least one memory including computer program code, the at least one memory and the computer program code being configured to, with the at least one processor, cause the apparatus at least to receive, by an intermediary network function, a subscription request from a network function consumer requesting data of a network function producer, wherein the subscription request comprises a client credential assertion of the network function consumer and an access token, authorize and authenticate, by the intermediary network function, the network function consumer upon successful validation of the access token and the client credential assertion validation and transmit, by the intermediary network function, an access token request to an authorization server to get another access token, wherein said another access token is to be used to validate the network function consumer to access services of the network function producer, and the access token request comprises the client credential assertion of the network function consumer requesting data of the network function producer.

According to a second aspect of the present invention, there is provided an apparatus comprising at least one processor, at least one memory including computer program code, the at least one memory and the computer program code being configured to, with the at least one processor, cause the apparatus at least to receive, by an authorization server, an access token request from an intermediary network function, wherein the access token request comprises a client credential assertion of a network function consumer requesting data of a network function producer via a messaging framework, generate, by the authorization server, an access token to be used to validate the network function consumer to data of the network function producer upon checking the client credential assertion of the network function consumer and transmit, by the authorization server, an access token response to the intermediary network function, wherein the access token response comprises the access token.

According to a third aspect of the present invention, there is provided an apparatus comprising at least one processor, at least one memory including computer program code, the at least one memory and the computer program code being configured to, with the at least one processor, cause the apparatus at least to receive, by a network function producer, a subscription request from an intermediary network function to validate a network function consumer to access data of the network function producer via a messaging framework, the subscription request comprising a client credential assertion of the network function consumer, a client credential assertion of the intermediary network function, a call back uniform resource identifier of a messaging framework and an access token, authorize the subscription request to notify data to the network function consumer via the messaging framework and transmit, by the network function producer, a subscription response to the intermediary network function, the subscription response comprising a call-back uniform resource identifier pointing to the network function producer.

According to a fourth aspect of the present invention, there is provided an apparatus comprising at least one processor, at least one memory including computer program code, the at least one memory and the computer program code being configured to, with the at least one processor, cause the apparatus at least to transmit, by a network function consumer, a subscription request to an intermediary network function instead of a network function producer, wherein the subscription request comprises a client credential assertion of the network function consumer and an access token.

According to a fifth aspect of the present invention, there is provided a method, comprising receiving, by an intermediary network function, a subscription request from a network function consumer requesting data of a network function producer, wherein the subscription request comprises a client credential assertion of the network function consumer and an access token, authorizing and authenticating, by the intermediary network function, the network function consumer upon successful validation of the access token and the client credential assertion validation and transmitting, by the intermediary network function, an access token request to an authorization server to get another access token, wherein said another access token is to be used to validate the network function consumer to access services of the network function producer, and the access token request comprises the client credential assertion of the network function consumer requesting data of the network function producer.

According to a sixth aspect of the present invention, there is provided a method, comprising receiving, by an authorization server, an access token request from an intermediary network function, wherein the access token request comprises a client credential assertion of a network function consumer requesting data of a network function producer via a messaging framework, generating, by the authorization server, an access token to be used to validate the network function consumer to data of the network function producer upon checking the client credential assertion of the network function consumer and transmitting, by the authorization server, an access token response to the intermediary network function, wherein the access token response comprises the access token.

According to a seventh aspect of the present invention, there is provided a method, comprising receiving, by a network function producer, a subscription request from an intermediary network function to validate a network function consumer to access data of the network function producer via a messaging framework, the subscription request comprising a client credential assertion of the network function consumer, a client credential assertion of the intermediary network function, a call back uniform resource identifier of a messaging framework and an access token, authorizing the subscription request to notify data to the network function consumer via the messaging framework and transmitting, by the network function producer, a subscription response to the intermediary network function, the subscription response comprising a callback uniform resource identifier pointing to the network function producer.

According to an eighth aspect of the present invention, there is provided a method, comprising transmitting, by a network function consumer, a subscription request to an intermediary network function instead of a network function producer, wherein the subscription request comprises a client credential assertion of the network function consumer and an access token.

According to a ninth aspect of the present invention, there is provided an apparatus, comprising means for performing the method of the fifth, sixth, seventh or the eighth aspect.

According to a tenth aspect of the present invention, there is provided non-transitory computer readable medium having stored thereon a set of computer readable instructions that, when executed by at least one processor, cause an apparatus to at least perform the method of the fifth, sixth, seventh or the eighth aspect. According to an eleventh aspect of the present invention, there is provided a computer program configured to perform the method of the third aspect.

EXAMPLE EMBODIMENTS

Authorization may be improved by providing a procedure for a Data Collection Coordination Function, DCCF, so that the DCCF may validate authentication and authorization aspects between a Network Function consumer, NFc, and a Network Function producer, NFp, before passing any data back to the NFc, possibly via a Messaging Framework, MF.

Figure 1:
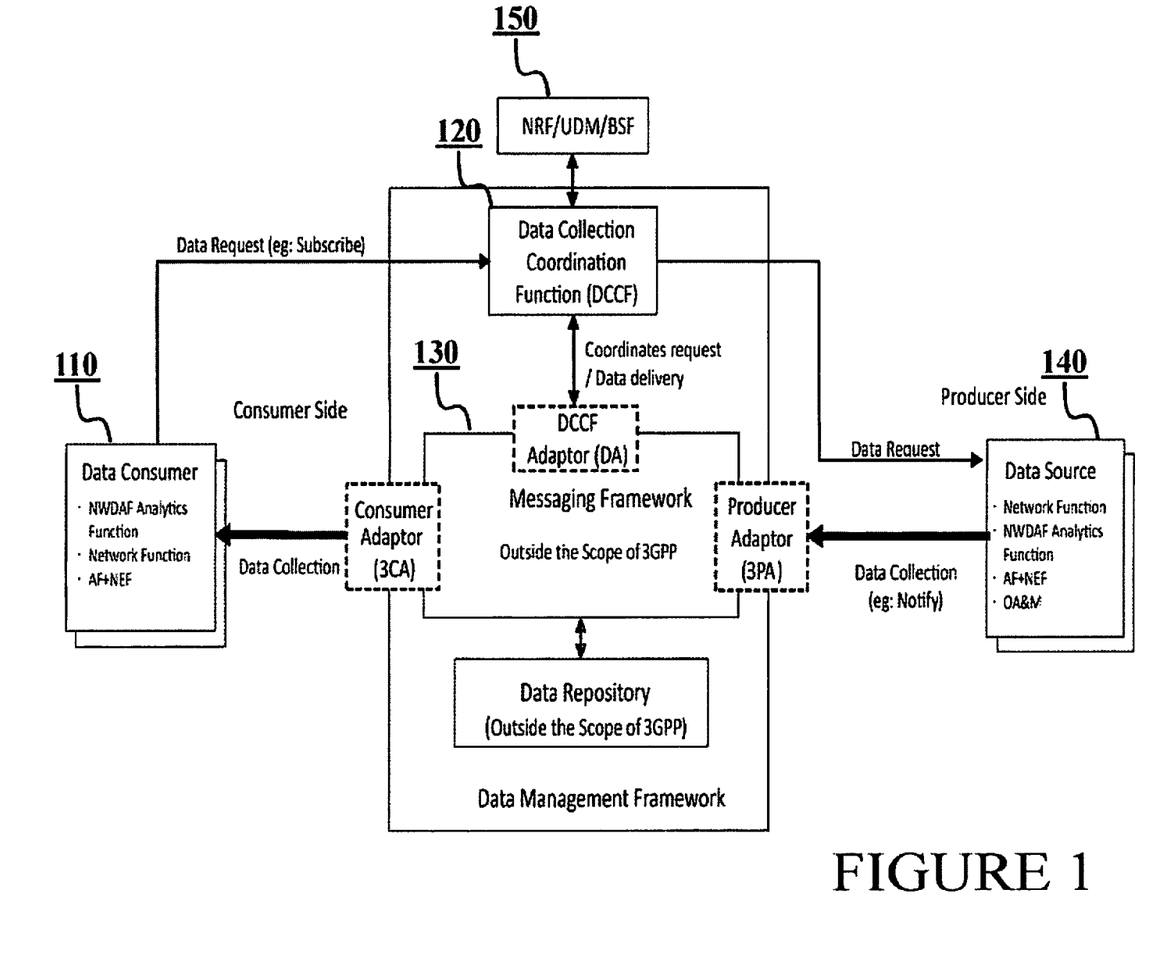
FIG. 1 illustrates an exemplary data management framework in accordance with at least some example embodiments.

FIG. 1 illustrates an exemplary data management framework in accordance with at least some example embodiments of the present invention. The exemplary data management framework of FIG. 1 comprises data consumer 110, DCCF 120, MF 130, data source 140, and authorization server 150. Data consumer 110 may be referred to as a NFc. For instance, data consumer 110 may be a Network Data Analytics Function, NWDAF, as defined in a 3rd Generation Partnership Project, 3GPP, standard specification TS 23.288, and the NWDAF may calculate analytics based on data collected from different data sources, such as an Access and Mobility management Function AMF, Session Management Function SMF, Policy Control Function, PCF, Unified Data Management, UDM, Application Function, AF, and Operations Administration and Maintenance, OAM. The NWDAF may offer analytics identified by a 3GPP defined analytics identifier to consumers using the service-based architecture defined for the 5G core network for example.

DCCF 120 may find the right data producer, i.e., data source 140, identify the serving network function per User Equipment, UE, control data replication and consolidate subscriptions. DCCF Adaptor, DA, may coordinate requests and/or data delivery. MF 130 may forward data from data source 140 to data consumer 110, possibly via Producer Adaptor, 3PA, and Consumer Adaptor, 3CA, and may duplicate data to be sent to different entities such as different data consumers 110, or a data repository and data consumer 110. Data source 140 may be referred to as a NFp. Authorization server 150 may be a Network Repository Function, NRF. Some embodiments of the present invention may be applied in an OAuth2.0 framework for authorization of Network Function, NF, service access as defined in a 3GPP standard specification TS 33.501.

DCCF 120 may introduce a new path for NFc1 110 to access the data from data sources 140, i.e., NFps. Due to the introduction of DCCF 120 between NFc1 110 and NFp 140, security mechanisms need to be enhanced. For instance, if NFc1 110 is not allowed to access data from NFp 140, it should be ensured that DCCF 120 does not provide NFp 140 related data to NFc1 110.

Another issue is that if NFc1 110 is allowed to access data from NFp 140, NFc1 110 may ask for data that can be produced by NFp 140 and in such a case DCCF 120 may request said data from NFp 140. So DCCF 120 may coordinate data distribution, possibly via MF 130. However, another NFc (not shown in FIG. 1) may not be allowed to access data provided by NFp 140. So if said another NFc asks for the same data as NFc1 110, DCCF 120 and/or MF 130 may already have said data but then DCCF 120 should be able to ensure that it will not provide data that has been already obtained from NFp 140 to said another NF.

Moreover, Client Credentials Assertion, CCA, as defined for example in a 3GPP standard specification TS 33.501, of NFc1 110 may be required for indirect communication so that NFp 140 can authenticate NFc1 110. So in case of DCCF 120 based communication, when data source 140 changes (e.g., UE mobility scenarios), DCCF 120 should somehow get a new CCA of NFc1 110 to authenticate NFc1 110 with the new data source.

Embodiments of the present invention address the above mentioned issues. More specifically, embodiments of the present invention enable a procedure where DCCF 120 can validate authentication and authorization aspects between NFc1 110 and NFp 140 before passing any data back to NFc1 110, possibly via MF 130.

Figure 2:
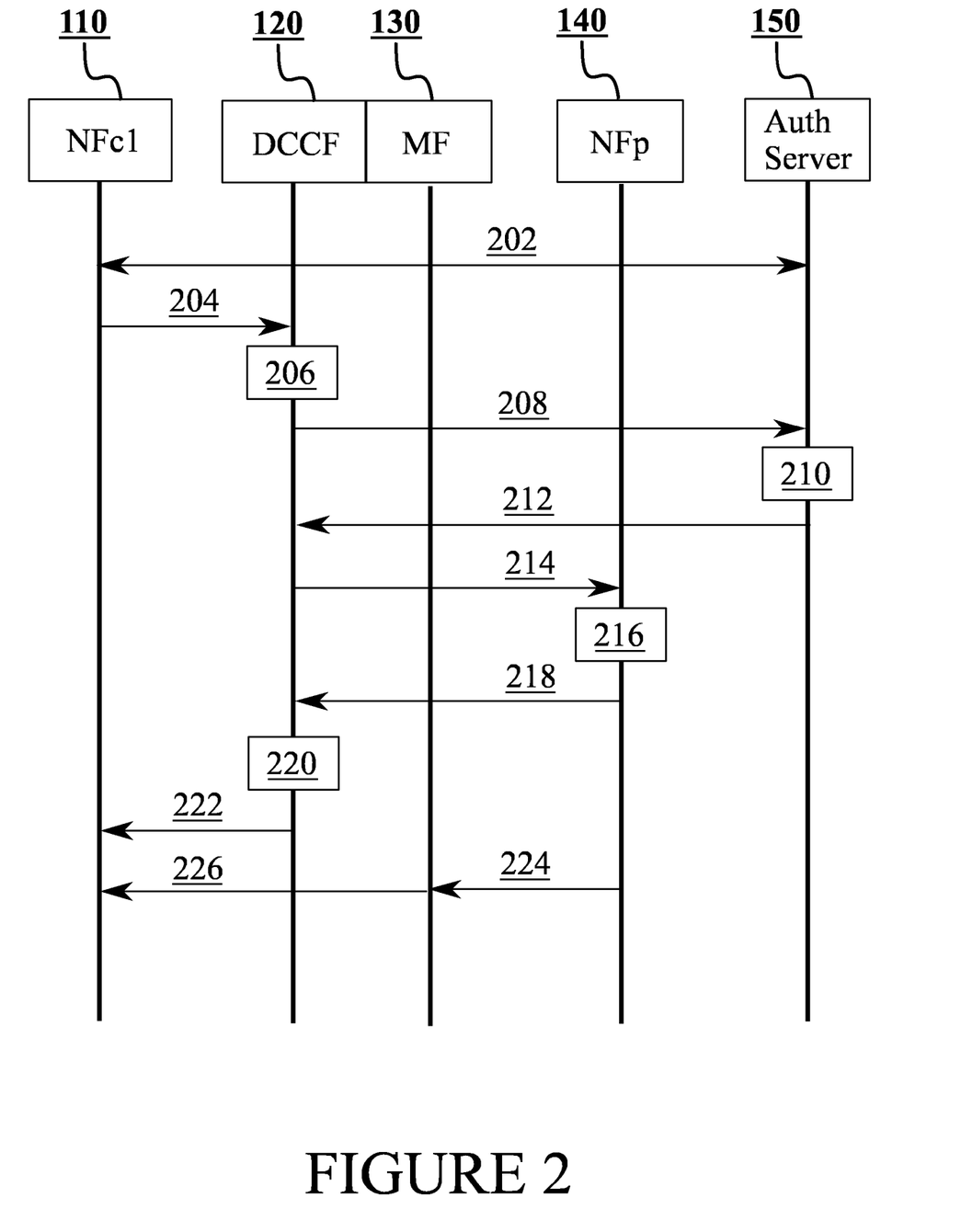
FIG. 2 illustrates a first signalling example in accordance with at least some example embodiments.

FIG. 2 illustrates a first signalling example in accordance with at least some example embodiments. On the vertical axes are disposed, from the left to the right, NFc1 110, DCCF 120, MF 130, NFp 140 and authorization server 150, i.e., the NRF. Time advances from the top towards the bottom. FIG. 2 illustrates an example, wherein NFc1 110 sends a subscription request to DCCF 120, to request access to services/data of NFp 140, but DCCF 120 and/or MF 130 does not have the requested data of NFp 140.

At phase 202, if NFc1 110 wants to communicate with DCCF 120 to retrieve data of NFp 140, such as an AMF or SMF, NFc1 110 may retrieve an access token from authorization server 150 to get authorized at DCCF 120 later on. So NFc1 110 may transmit an access token request "Nnrf_AccessToken_Get Request, Target=DCCF" and receive an access token response comprising an access token to be used to validate, authorize and authenticate NFc1 110 at DCCF 120 via "Nnrf_AccessToken_Get Response (expires_in, access_token)".

At phase 204, NFc1 110 may initiate a subscription request to DCCF 120 to retrieve data of NFp 140, possibly via a data management framework comprising DCCF 120 and MF 130. NFc1 110 may include the access token received at phase 202 in a subscription request, e.g., in an authorization header of the subscription request. NFc1 110 may also include a CCA of NFc1 110 irrespective of direct or indirect communication. In some embodiments, a target NF type in the CCA will include DCCF 120, authorization server 150, and NFp 140. NFc1 110 If NFc1 110 is not certain of the possible NFtype of the NFp 140 then the NFc1 110 can add the all possible NFtype of the NFp 140 which can be applicable. For example, the subscription request may be "Ndccf_EventExposure_Subscribe (Nxxx_Service, Parameters), CCA {Nftype=DCCF, AMF, NRF}, Token" That is to say, NFc1 110 requesting data via DCCF 120, comprising a CCA of NFc1 110 and the access token to be used to validate NFc1 110 at DCCF 120.

If NFc1 110, such as a NWDAF or any other NF, and DCCF 120 are in direct communication, a CCA of NFc1 110 would not be required for DCCF 120 and the target NF type=DCCF may be skipped. However, communication from NFc1 110 to other NFs via DCCF 120 is indirect communication and hence, in some embodiments, the CCA of NFc1 110 may need to be included to the subscription request at phase 204 irrespective of whether there is a Service Communication Proxy, SCP, between NFc1 110 and DCCF 120. That is to say, the CCA of NFc1 110 may need to be included to the subscription request at phase 204 irrespective of whether NFc1 110 and DCCF 120 are directly connected, said direct connection referring to a case where there are no SCP between NFc1 110 and DCCF 120. So in case of a direct connection the subscription request may go from NFc1 110 to DCCF 120 without traversing an SCP.

At phase 206, DCCF 120 may validate the access token and the CCA received from NFc1 110 and validate NFc1 110. That is to say, DCCF 120 may authorize and authenticate NFc1 110 upon successful validation of the access token and the CCA of NFc1 110.

At phase 208, DCCF 120 may check whether data is already available for distribution to NFc1 110 via MF 130. If the data is not available, then the DCCF 120 may discover the data source, such as NFp 140, based on the existing mechanism (via NRF, UDM etc) defined in TS 23288. To contact the data source, i.e., NFp 140, DCCF 120 needs to get a another token (said another access token) from the NRF. DCCF 120 may transmit an access token request to authorization server 150, wherein the requested said another access token is to be used to validate NFc1 110 to access services of NFp 140 and the access token request comprises the CCA of NFc1 110 requesting access to services of NFp 140. For instance, if DCCF 120 checks and finds that data of NFp 140 is not already available for distribution to NFc1 110 via MF 130, DCCF 120 may discover NFp 140, i.e., the data source, via an NRF or UDM. But to contact NFp 140 properly, DCCF 120 may need to get said another access token from authorization server 150. For this, DCCF 120 may form the access token request so that the access token comprises an identity of NFc1 110 and/or an identity of MF 130. Alternatively, or in addition, DCCF 120 may form the access token request so that the access token request comprises at least the CCA of NFc1 110, and possibly the CCA of DCCF 120 as well. The access token request may be for example "Nnrf_AccessToken_Get Request ( . . . Target=AMF, SubscribingNF=NWDAF Id, and Message-Framework Id . . . ) CCA-NFc1

At phase 210, authorization server 150 may generate a digitally signed access token for an access token response, possibly with information about the subscribing NFs (SubscribingNFInfo) included as a new claim to the access token response. Said information about the subscribing NFs may comprise identifiers of NFc1 110 and MF 130. That is to say, authorization server 150 may generate, at phase 210, said another access token to be used to validate NFc1 110 to access service of NFp 140 NFc1 110. Thus, authorization server 150 may authorize DCCF 120 to subscribe to access to services, i.e., data, of NFp 140 on behalf of NFc1 110 and MF 130 NFc1 110. Indirectly, authorization server 150 may also authorize NFp 140 to send notifications to NFc1 110, DCCF 120 and MF 130. That is to say, said another access token may authorize NFc1 110, DCCF 120 and MF 130 to receive notifications from NFp 140.

At phase 212, authorization server 150 may transmit an access token response to DCCF 120, the access token response comprising said another access token. The access token response may be for example "Nnrf_AccessToken_Get Response (expires_in, access_token{Token-2})". The access token response may also comprise identifiers of two subscribing network entities, said two subscribing network entities comprising NFc1 110 and MF 130, so that a single token may be used to avoid unnecessary consumption of resources. For instance, the access token response may comprise AccessTokenClaims according to the following table.

TABLE 1

| Type: AccessTokenClaims | | | | |
|---|---|---|---|---|
| Attribute name | Data type | P | Cardinality | Description |
| SubscribingNFInfo | Array(NfInstanceId/Set Id/. . .) | M | 1 | This IE shall contain NF instance id list called subscribing NF NFc1 110 and MF 130 |

Alternatively, authorization server 150 may provide two access tokens, one for NFc1 110 to access NFp 140 and another one for DCCF 120 and/or MF 130 to access NFp 140.

At phase 214, DCCF 120 may transmit a subscription request to NFp 140, to validate NFc1 110 to access services of NFp 140, the subscription request to NFp 140 comprising the CCA of NFc1 110 and said another access token. Said subscription request to NFp 140 may be for example "Namf_EventExposure_Subscribe, CCA-NWDAF, CCA-DCCF, Token-2". That is to say, DCCF 120 may provide two CCA headers to NFp 140, the first which is received from NFc1 110 and the second one is self-generated by DCCF 120. At phase 216, NFp 140 must check said another access token/claim(s) before providing a service to DCCF 120 or sending notifications to MF 130. NFp 140 may then validate NFc1 110 to access services of NFp 140 via DCCF 120. DCCF 120 may also include the callback Uniform Resource Identifier, URI, of MF 130 to the subscription request to NFp 140 so that NFp 140 can send a notification/data to MF 130 directly.

At phase 218, NFp 140 may transmit a subscription response to DCCF 120. If the validation was successful, the subscription response may comprise a callback URI pointing to NFp 140 only which can be used for further communication to NFp 140 from DCCF 120. Therefore, authorization server 150 may authorize MF 130 to collect data on behalf of DCCF 120.

At phase 220, DCCF 120 and MF 130 may create a subscription if the subscription response indicates successful subscription/validation. Otherwise DCCF 120 may reject the subscription request. At phase 222, DCCF 120 may transmit a subscription response to NFc1 110. At phase 224, NFp 140 may transmit at least one notification to MF 130 and, at phase 226, said at least one notification may be forwarded to NFc1 110 via MF 130. Once the association is established then MF 130 may start sending stored data or newly received data from NFp 140 towards NFc1 110.

Figure 3:
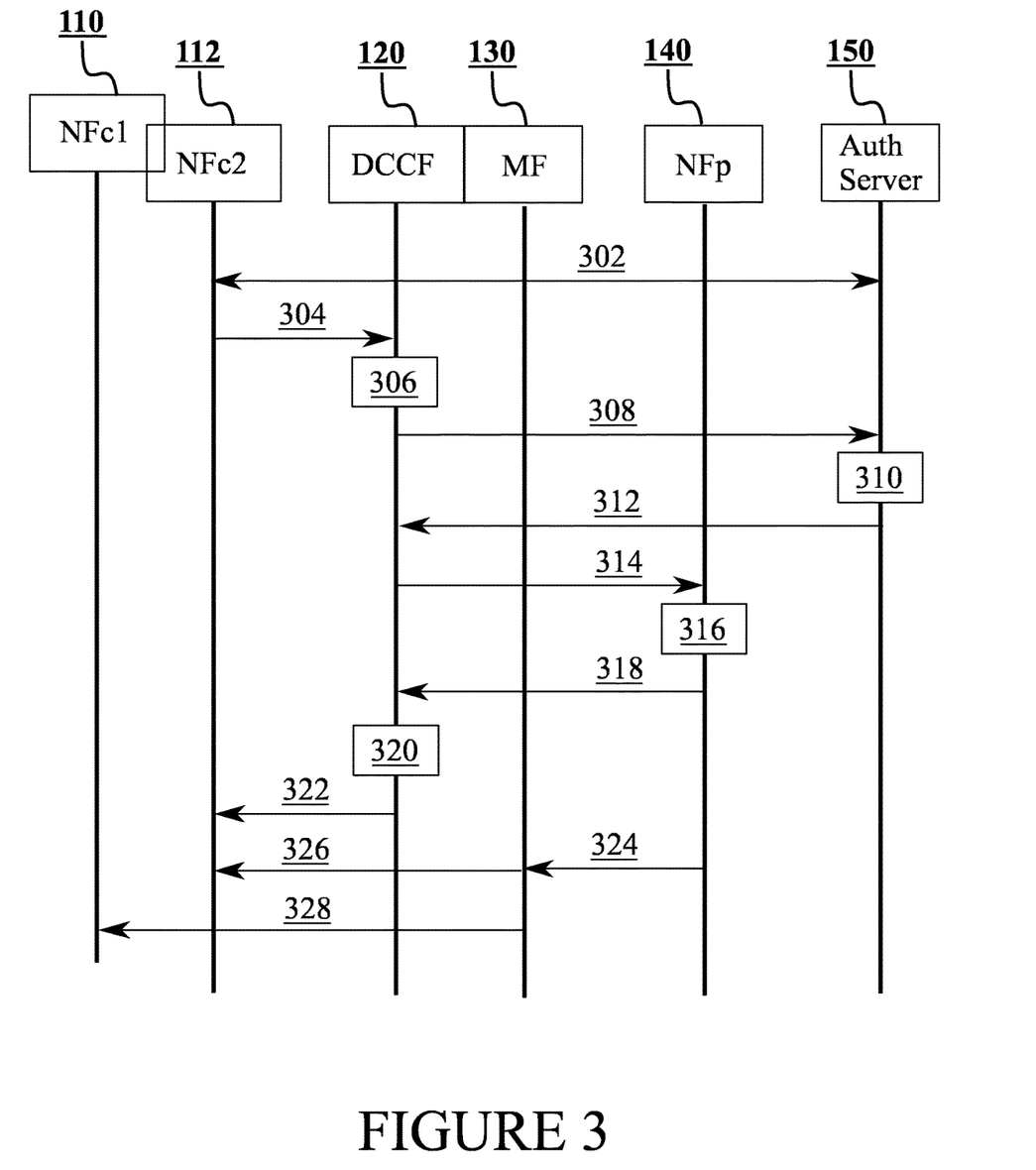
FIG. 3 illustrates a second signalling example in accordance with at least some example embodiments.

FIG. 3 illustrates a second signalling example in accordance with at least some example embodiments. Similarly as in FIG. 2, on the vertical axes are disposed, from the left to the right, NFc1 110, DCCF 120, MF 130, NFp 140 and authorization server 150, such as a NRF. In addition, another NFc2 112 is shown in FIG. 3. Time advances from the top towards the bottom. FIG. 3 illustrates an example, wherein said another NFc2 112 may transmit a subscription request to DCCF 120 for the same data source, i.e., NFp 140, and data is already available in DCCF 120 and/or MF 130. That is to say, FIG. 3 demonstrates data access authorization when DCCF 120 has already subscribed to NFp 140.

NFc1 110 may, before phase 302, start collecting data from NFp 140. That is to say, the second signalling example of FIG. 3 may take place after the first signalling example shown in FIG. 2. Phases 302-326 may correspond to phases 202-226 in FIG. 2, respectively. When another NFc2 112 wants to collect data from NFp 140, said another NFc2 112 may, at phase 304, transmit a subscription request "Subscribe, CCA {Nftype=DCCF, AMF}, Token" to DCCF 120, to request access to services, i.e., data, of NFp 140. At phase 306, DCCF 120 may authorize and authenticate another NFc2 112 upon validating an access token received in the subscription request of another NFc2 112. In addition, DCCF 120 may determine that DCCF 120 and/or MF 130 does not have the requested data of NFp 140. DCCF 120 may therefore retrieve an access token, wherein the access token is to be used to access services of NFp 140 by another NFc2 112, from authorization server by transmitting, at phase 308, an access token request "Nnrf_AccessToken_Get Request ( . . . Target=AMF, SubscribingNF=NFc-2, InstanceId/SetId, and MessageFramework Id . . . ) CCA-NFc-2, CCA-DCCF" and receiving, at phase 312, an access token response "Nnrf_AccessToken_Get Response (expires_in, access_token{Token-2})" comprising the access token to be used to access services of NFp 140 by another NFc2 112.

To validate, authenticate and authorize another NFc2 112 at NFp 140, possibly via the CCA of NFc2 112, DCCF 120 may use, at phase 314, the callback URI provided by NFp 140 to send a notification request or subscription update request message to NFp 140 for example with access tokens and CCA headers "Namf_EventExposure_SubscribeModify or Notification_ReAuthCallback, CCA-NWDAF, CCA-DCCF, Token-2". That is to say, DCCF 120 may, at phase 314, transmit a subscription update request or Notification_ReAuthCallback request to NFp 140 to validate another NFc2 112 to access services of NFp 140.

At phase 316, NFp 140 may validate the CCA of another NFc2 112 and the access token received at phase 314, and authorize another NFc2 112 to access services of NFp 140. If authorization is completed successfully, NFp 140 may, at phase 318, transmit a subscription update response indicating success to DCCF 120. Upon receiving the subscription update response, DCCF 120 may at phase 320 create a subscription in MF 130 so that data requested by another NFc2 112 and collected from NFp 140 may be sent towards another NFc2 112. At phase 322, DCCF 120 may transmit a subscription response to another NFc2 112. When new data is received from NFp 140 at phase 324, MF 130 may send notifications at phases 326 and 328 based on a list of authorized NFcs to another NFc2 112 and NFc1 110, respectively.

In some embodiments, a data source may change, for instance in UE mobility scenarios. As an example, a change of a data source, i.e., NFp 140, may occur if UE session is moving from AMF (Set1) or NFp 140 to AMF2 (Set2) or another NFp. Therefore, DCCF 120 may need to make sure said another NFp authenticates and authorizes NFc1 110 so that MF 130 continues to send data to NFc1 110. DCCF 120 may determine a change of the data source from NFp 140 to said another NFp for example by subscribing to the UDM to be notified when the NFp serving specific UEs changes.

Upon determining the change, DCCF 120 may send at least one notification about the change to NFc1 110, e.g., with a cause DATA_SOURCE_CHANGE and a new data source detail. After receiving the at least one notification, NFc1 110 may send a subscription update request to DCCF 120, for example without data. The subscription update request may comprise at least a new CCA of NFc1 110, wherein the new CCA may further comprise a type of said another NFp. For instance, the subscription update request may be "Target NFtype=NFp (example AMF, SMF) and NFtype=DCCF (for indirect communication)". NFc1 110 may also add the access token to the subscription update request for DCCF 120. Alternatively, or in addition, a new callback URI may also be added for the subscription update request.

DCCF 120 may authenticate NFc1 110 based on the CCA of NFc1 110 (for indirect communication) and authorize NFc1 110 based on the access token. DCCF 120 may also contact said another NFp so that said another NFp can authenticate and authorize NFc1 110 following the steps described in FIG. 2. That is to say, DCCF 120 may transmit a subscription request to said another NFp to validate NFc1 110 to access service of said another NFp, the subscription request comprising the CCA of NFc1 110, CCA of DCCF 120 and a new token DCCF 120 should have received from authorization server/NRF 150 to be checked by the said another NFp.

Even though DCCF 120 is used as an example, embodiments of the present invention may also be applied for any intermediary NF in general. That is to say, DCCF 120 is an intermediary NF and may be replaced with any other intermediary NF, such as an UDM or NWDAF. Similarly, NFc1 110 and NFc2 112 may be any NF consumers, such as a NWDAF or Network Exposure Function, NEF. For instance, a NEF may access an AMF and/or SMF based notification via an UDM. In some embodiments, NFc1 110 may be a NEF while DCCF 120 and/or MF 130 may be an UDM. Alternatively, NWDAF1 may ask another NWDAF2 to collect data for NWDAF1 and in such a case NWDAFs may also be configured to act as the intermediate function and handle the authorization for NWDAF1 (as NFc1 110) to access services from NFp 140.

Figure 4:
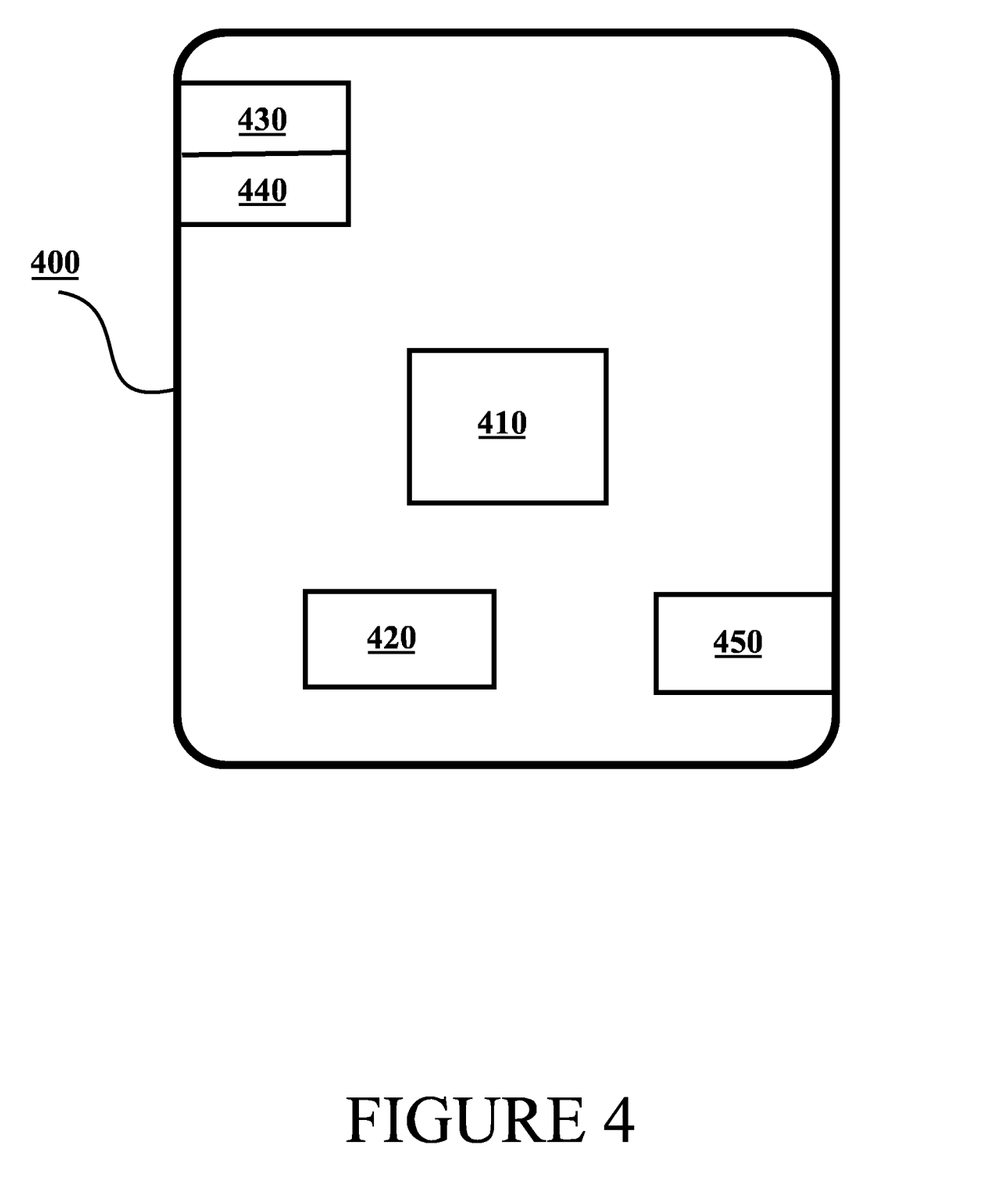
FIG. 4 illustrates an example apparatus capable of supporting at least some example embodiments.

FIG. 4 illustrates an example apparatus capable of supporting at least some example embodiments. Illustrated is device 400, which may comprise, for example, DCCF 120 or authorization server 150, or a device controlling functioning thereof. Comprised in device 400 is processor 410, which may comprise, for example, a single- or multi-core processor wherein a single-core processor comprises one processor and a multi-core processor comprises more than one processor. Processor 410 may comprise, in general, a control device. Processor 410 may comprise more than one processor. Processor 410 may be a control device. Processor 410 may comprise at least one Application-Specific Integrated Circuit, ASIC. Processor 410 may comprise at least one Field-Programmable Gate Array, FPGA. Processor 410 may comprise an Intel Xeon processor for example. Processor 410 may be means for performing method steps in device 400, such as determining, causing transmitting and causing receiving. Processor 410 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a network function, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 400 may comprise memory 420. Memory 420 may comprise random-access memory and/or permanent memory. Memory 420 may comprise at least one RAM chip. Memory 420 may comprise solid-state, magnetic, optical and/or holographic memory, for example. Memory 420 may be at least in part accessible to processor 410. Memory 420 may be at least in part comprised in processor 410. Memory 420 may be means for storing information. Memory 420 may comprise computer instructions that processor 410 is configured to execute. When computer instructions configured to cause processor 410 to perform certain actions are stored in memory 420, and device 400 overall is configured to run under the direction of processor 410 using computer instructions from memory 420, processor 410 and/or its at least one processor may be considered to be configured to perform said certain actions. Memory 420 may be at least in part comprised in processor 410. Memory 420 may be at least in part external to device 400 but accessible to device 400.

Device 400 may comprise a transmitter 430. Device 400 may comprise a receiver 440. Transmitter 430 and receiver 440 may be configured to transmit and receive, respectively, information in accordance with at least one cellular standard, such as a standard defined by the 3GPP. Transmitter 430 may comprise more than one transmitter. Receiver 440 may comprise more than one receiver. Transmitter 430 and/or receiver 440 may be configured to operate in accordance with a suitable communication standard.

Device 400 may comprise User Interface, UI, 450. UI 450 may comprise at least one of a display, a keyboard, a touchscreen, a vibrator arranged to signal to a user by causing device 400 to vibrate, a speaker and a microphone. A user may be able to operate device 400 via UI 450, for example to configure device 400 and/or functions it runs.

Processor 410 may be furnished with a transmitter arranged to output information from processor 410, via electrical leads internal to device 400, to other devices comprised in device 400. Such a transmitter may comprise a serial bus transmitter arranged to, for example, output information via at least one electrical lead to memory 420 for storage therein. Alternatively to a serial bus, the transmitter may comprise a parallel bus transmitter. Likewise processor 410 may comprise a receiver arranged to receive information in processor 410, via electrical leads internal to device 400, from other devices comprised in device 400. Such a receiver may comprise a serial bus receiver arranged to, for example, receive information via at least one electrical lead from receiver 440 for processing in processor 410. Alternatively to a serial bus, the receiver may comprise a parallel bus receiver.

Device 400 may comprise further devices not illustrated in FIG. 4. In some example embodiments, device 400 lacks at least one device described above. For example, device 400 may not have UI 450.

Processor 410, memory 420, transmitter 430, receiver 440 and/or UI 450 may be interconnected by electrical leads internal to device 400 in a multitude of different ways. For example, each of the aforementioned devices may be separately connected to a master bus internal to device 400, to allow for the devices to exchange information. However, as the skilled person will appreciate, this is only one example and depending on the example embodiment various ways of interconnecting at least two of the aforementioned devices may be selected without departing from the scope of the present invention.

Figure 5:
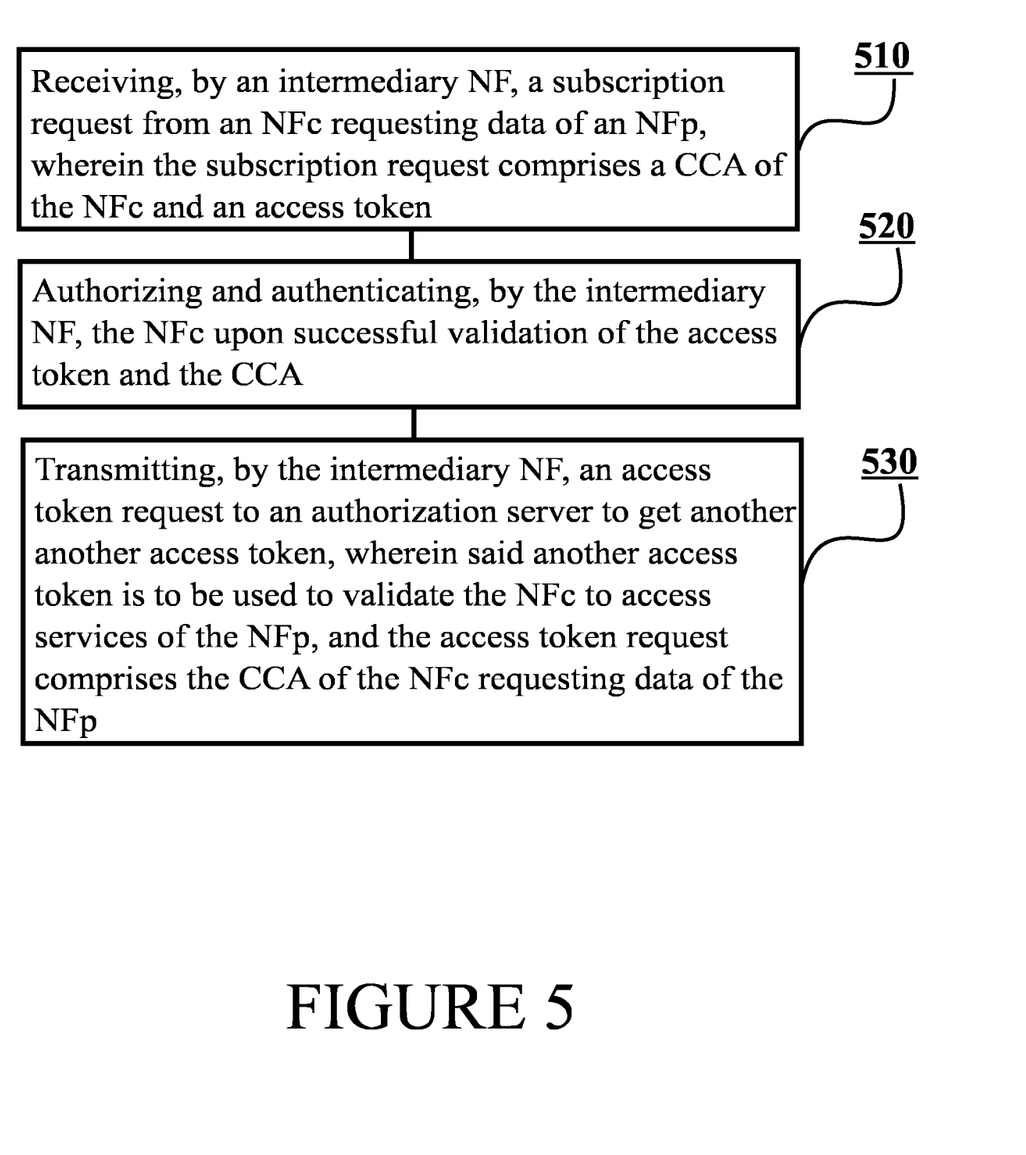
FIG. 5 illustrates a flow graph of a first method in accordance with at least some example embodiments.

FIG. 5 is a flow graph of a first method in accordance with at least some example embodiments. The phases of the illustrated first method may be performed by DCCF 120, or by a control device configured to control the functioning thereof, possibly when installed therein.

The first method may comprise, at step 510, receiving, by an intermediary network function, a subscription request from a network function consumer requesting data of a network function producer, wherein the subscription request comprises a client credential assertion of the network function consumer and an access token. The first method may also comprise, at step 520, authorizing and authenticating, by the intermediary network function, the network function consumer upon successful validation of the access token and the client credential assertion validation. Finally, the first method may comprise, at step 530, transmitting, by the intermediary network function, an access token request to an authorization server to get another access token, wherein said another access token is to be used to validate the network function consumer to access services of the network function producer, and the access token request comprises the client credential assertion of the network function consumer requesting data of the network function producer.

Figure 6:
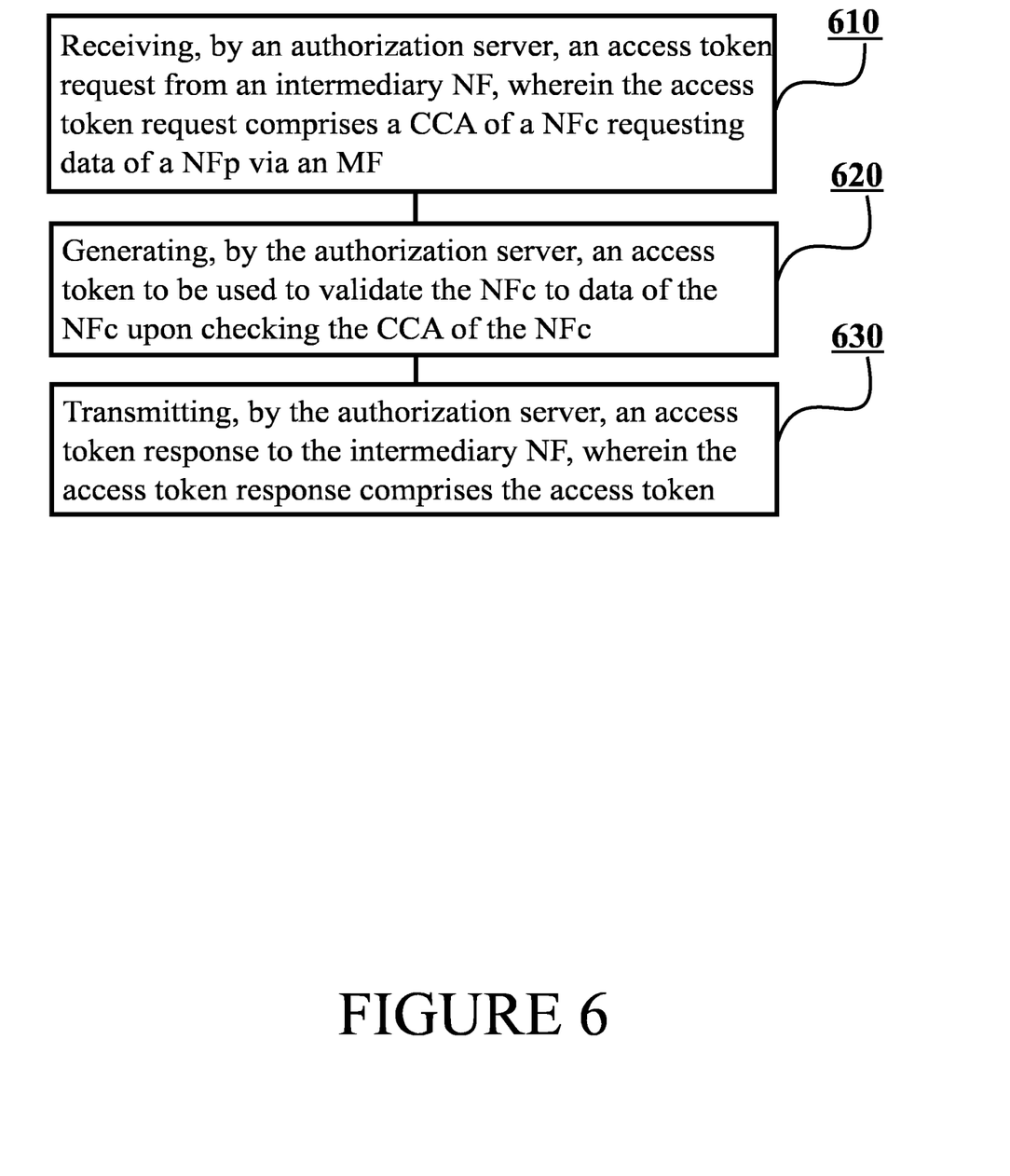
FIG. 6 illustrates a flow graph of a second method in accordance with at least some example embodiments.

FIG. 6 is a flow graph of a second method in accordance with at least some example embodiments. The phases of the illustrated second method may be performed by authorization server 150, such as an NRF, or by a control device configured to control the functioning thereof, possibly when installed therein.

The second method may comprise, at step 610, receiving, by an authorization server, an access token request from an intermediary network function, wherein the access token request comprises a client credential assertion of a network function consumer requesting data of a network function producer via a messaging framework. The second method may also comprise, at step 620, generating, by the authorization server, an access token to be used to validate the network function consumer to data of the network function producer upon checking the client credential assertion of the network function consumer. Finally, the second method may comprise, at step 630, transmitting, by the authorization server, an access token response to the intermediary network function, wherein the access token response comprises the access token.

It is to be understood that the example embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one example embodiment or an example embodiment means that a particular feature, structure, or characteristic described in connection with the example embodiment is included in at least one example embodiment. Thus, appearances of the phrases "in one example embodiment" or "in an example embodiment" in various places throughout this specification are not necessarily all referring to the same example embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and examples may be referred to herein along with alternatives for the various components thereof. It is understood that such example embodiments, examples, and alternatives are not to be construed as de facto equivalents of one another, but are to be considered as separate and autonomous representations.

In an example embodiment, an apparatus, such as, for example, DCCF 120 or authorization server 150, or a device controlling functioning thereof, may comprise means for carrying out the example embodiments described above and any combination thereof.

In an example embodiment, a computer program may be configured to cause a method in accordance with the example embodiments described above and any combination thereof. In an exemplary example embodiment, a computer program product, embodied on a non-transitory computer readable medium, may be configured to control a processor to perform a process comprising the example embodiments described above and any combination thereof.

In an example embodiment, an apparatus, such as, for example, DCCF 120 or authorization server 150, or a device controlling functioning thereof, may comprise at least one processor, and at least one memory including computer program code, wherein the at least one memory and the computer program code are configured to, with the at least one processor, cause the apparatus at least to perform the example embodiments described above and any combination thereof.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the example embodiments in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some example embodiments find industrial application at least in 5G core networks, and possibly in other core networks in the future as well.

Acronyms List

3CA Consumer Adaptor
3GPP 3rd Generation Partnership Project

3PA Producer Adaptor
AF Application Function
AMF Access and Mobility Management Function
BSF Binding Support Function
CCA Client Credentials Assertion
DCCF Data Collection Coordination Function
MF Messaging Framework
NEF Network Exposure Function
NF Network Function
NFc NF Consumer
NFp NF Producer
NRF Network Repository Function
NWDAF Network Data Analytics Function
OAM Operations Administration and Maintenance
PCF Policy Control Function
SCP Service Communication Proxy
SMF Session Management Function
UDM Unified Data Management
UE User Equipment
URI Uniform Resource Identifier

REFERENCE SIGNS LIST

| | |
|---|---|
| 110, 112 | NFc |
| 120 | DCCF, intermediary NF in general |
| 130 | MF |
| 140 | NFp |
| 150 | Authorization server |
| 202-226 | Steps of the process of FIG. 2 |
| 302-328 | Steps of the process of FIG. 3 |
| 400-450 | Structure of the apparatus of FIG. 4 |
| 510-530 | Phases of the first method in FIG. 5 |
| 610-630 | Phases of the second method in FIG. 6 |

The invention claimed is:

1. An apparatus comprising at least one processor, at least one memory including computer program code, the at least one memory and the computer program code being configured to,
with the at least one processor, cause the apparatus at least to:
receive, by an intermediary network function, a subscription request from a network function consumer requesting data of a network function producer, wherein the subscription request comprises a client credential assertion of the network function consumer and an access token;
authorize and authenticate, by the intermediary network function, the network function consumer upon successful validation of the access token and the client credential assertion validation;
transmit, by the intermediary network function, an access token request to an authorization server to get another access token, wherein said another access token is to be used to validate the network function consumer to access services of the network function producer, and the access token request comprises the client credential assertion of the network function consumer requesting data of the network function producer;
determine, by the intermediary network function, a change of a data source from the network function producer to another network function producer; and
transmit at least one notification about the change of the data source to the network function consumer.

2. An apparatus according to claim 1, wherein the received subscription request comprises the client credential assertion of the network function consumer irrespective of whether the network function consumer and the intermediary network function are directly connected.

3. An apparatus according to claim 1, wherein the access token request comprises a client credential assertion of the intermediary network function.

4. An apparatus according to claim 1, wherein the received client credential assertion of the network function consumer comprises a target network function type of the network function producer.

5. An apparatus according to claim 1, wherein the transmitted access token request comprises an identity of a messaging framework that propagates data from the network function producer to the network function consumer.

6. An apparatus according to claim 1, wherein the at least one memory and the computer program code are configured to, with the at least one processor, further cause the apparatus to:
receive, by the intermediary network function, an access token response from the authorization server, the access token response comprising said another access token to be used to access services of the network function producer, wherein the access token response comprises identifiers of two subscribing network entities, said two subscribing network entities further comprising the network function consumer and the messaging framework.

7. An apparatus according to claim 6, wherein said another access token authorizes the intermediary network function, the network function consumer and a messaging framework to receive notifications from the network function producer.

8. An apparatus according to claim 7, wherein said another access token is to be used by the intermediary network function to subscribe to access services of the network function producer on behalf of the network function consumer and the messaging framework.

9. An apparatus according to claim 6, wherein the at least one memory and the computer program code are configured to, with the at least one processor, further cause the apparatus to:
transmit, by the intermediary network function, a subscription request to the network function producer to validate the network function consumer to access data of the network function producer via a messaging framework, the subscription request comprising the client credential assertion of the network function consumer, a client credential assertion of the intermediary network function, a call back uniform resource identifier of a messaging framework and said another access token.

10. An apparatus according to claim 9, wherein the at least one memory and the computer program code are configured to, with the at least one processor, further cause the apparatus to:
receive, by the intermediary network function, a subscription response from the network function producer, the subscription response comprising a callback uniform resource identifier pointing to the network function producer.

11. An apparatus according to claim 10, wherein the at least one memory and the computer program code are configured to, with the at least one processor, further cause the apparatus to:
receive, by the intermediary network function, a subscription request from another network function consumer requesting access to services of the network function producer;

transmit, by the intermediary network function, a subscription update request to the network function producer, the subscription update request comprising a client credential assertion of said another network function consumer, a client credential assertion of the intermediary network function and an access token of said another network function consumer, to request the network function producer to validate said another network function consumer to data of the network function producer.

12. An apparatus according to claim 1, wherein the at least one memory and the computer program code are configured to, with the at least one processor, further cause the apparatus to:

receive, by the intermediary network function, a subscription update request from the network function consumer after transmitting the at least one notification, the subscription update request comprising a new client credential assertion of the network function consumer and a type of another network function producer; and transmit, by the intermediary network function, a subscription request to said another network function producer to validate the network function consumer to access services of said another network function producer, the subscription request comprising said another client credential assertion of the network function consumer.

13. An apparatus according to claim 1, wherein the intermediary network function is a unified data management function, a data collection coordination function or a network data analytics function.

* * * * *